United States Patent [19]

Jacquelin

[11] 4,230,780
[45] Oct. 28, 1980

[54] SODIUM-SULPHUR ELECTRIC CELL

[75] Inventor: Jean Jacquelin, Limours, France

[73] Assignee: Societe Anonyme dite: Compagnie Generale d'Electricite, Paris, France

[21] Appl. No.: 86,955

[22] Filed: Oct. 22, 1979

[30] Foreign Application Priority Data

Oct. 27, 1978 [FR] France ............................... 78 30592

[51] Int. Cl.$^3$ ........................................... H01M 10/39
[52] U.S. Cl. ...................................... 429/104; 429/191
[58] Field of Search ................. 429/104, 191, 193, 101

[56] References Cited

U.S. PATENT DOCUMENTS

| | | | |
|---|---|---|---|
| 3,770,502 | 11/1973 | Nakabayashi | 429/191 X |
| 3,933,523 | 1/1976 | Dubin et al. | 429/191 |
| 3,959,013 | 5/1976 | Breiter | 429/185 |
| 4,024,321 | 5/1977 | Tilley et al. | 429/104 |
| 4,042,757 | 8/1977 | Jones | 429/104 |
| 4,048,391 | 9/1977 | Tilley et al. | 429/104 |
| 4,076,903 | 2/1978 | Sudworth et al. | 429/104 |
| 4,125,682 | 11/1978 | Bordet et al. | 429/104 |

*Primary Examiner*—Anthony Skapars
*Attorney, Agent, or Firm*—Kenyon & Kenyon

[57] ABSTRACT

The invention relates to a sodium-sulphur type electric cell. It includes a positive compartment which contains:
- a positive active material (2) which is liquid at operating temperature, and a positive current collector (1);
- a negative compartment which contains a negative active material which is liquid at operating temperature, and a negative current collector;
- a solid electrolyte tube (6) which separates the two compartments; characterized in that the positive current collector is at least partially coated with an electronically insulating layer (7), means (8) which are suitable for concentrating the lines of ionic current (10) which prevails between said electrolyte tube and said positive collector being provided in such a way that during the cell recharging process, the positive active material is deposited preferentially level with said means. The invention is used in electric cells for electric vehicles.

6 Claims, 4 Drawing Figures

SODIUM-SULPHUR ELECTRIC CELL

The present invention relates to sodium-sulphur type electric cells.

It is known that the negative active material of such cells is an alkaline metal, generally sodium, which must be liquid at operating temperature. The positive active material is generally sulphur and sodium salts thereof. The electrochemical reaction reversibly forms sodium polysulphides whose sodium content increases during discharge. As for the electrolyte, which separates the positive active material from the negative active material, it must be solid at operating temperature, i.e. at about 300° C., permeable to alkaline ions which form in the negative compartment and impermeable to electrons. The electrolyte generally used is beta sodium alumina, i.e. a compound which contains about 5 to 9 molecules of alumina for one molecule of sodium oxide. In general, it is in the form of a tube whose lower portion is closed, the tube containing one of the active materials and being immersed in the other active material which is contained in an outer compartment. The electrolyte tube can be held by a support connected in a sealed manner to the tube and to the outer compartment.

In such electric cells, the discharge process transforms the sulphur into sodium polysulphides as shown in the sequence hereinbelow:

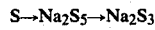

$$S \rightarrow Na_2S_5 \rightarrow Na_2S_3$$

During recharging, the reverse process occurs.

Now, it is observed that if, during discharge, the above-mentioned transformations take place easily, in contrast, during recharging, the transformation $Na_2S_5 \rightarrow S$ does not take place easily or satisfactorily.

Indeed, the sulphur which forms tends to be deposited on the electrolyte tube, thus interrupting the charging current by virtue of its insulating qualities.

To avoid such a drawback, a number of solutions have been proposed.

In particular, the use of low-conductivity graphite fibres in the positive compartment has been recommended, so that the regenerated sulphur can be spread better over the whole volume; however, while such a solution provides an appreciable improvement, it does not entirely solve the problem.

It has also been proposed to use graphite fibres of different electric resistance and to place the high-resistance fibres round or in the immediate vicinity of the electrolyte tube, while the low-resistance fibres occupy the remaining volume of the positive compartment. However, in this case, the sulphur forms at the interface between these two types of fibre and the previously-mentioned drawback is not thereby remedied. Nevertheless, the method can be slightly improved by using fibres in which the resistance decreases progressively from the electrolyte tube to the collector of the positive compartment.

Preferred embodiments of the present invention substantially overcome the above-mentioned disadvantage, constituting a cell structure in which recharging is substantially complete.

The present invention provides a sodium-sulphur type electric cell which includes:

a positive compartment which contains a positive active material which is liquid at operating temperature, and a positive current collector;

a negative compartment which contains a negative active material which is liquid at operating temperature, and a negative current collector; and a solid electrolyte tube which separates the two compartments;

wherein the positive current collector is at least partially coated with an electronically insulating layer, means which are suitable for concentrating the lines of ionic current which prevails between said electrolyte tube and said positive collector being provided in such a way that during the cell recharging process, the positive active material is preferentially deposited in the vicinity of said means.

Embodiments of the invention are described by way of example with reference to the accompanying drawings, in which.

Figure 1:
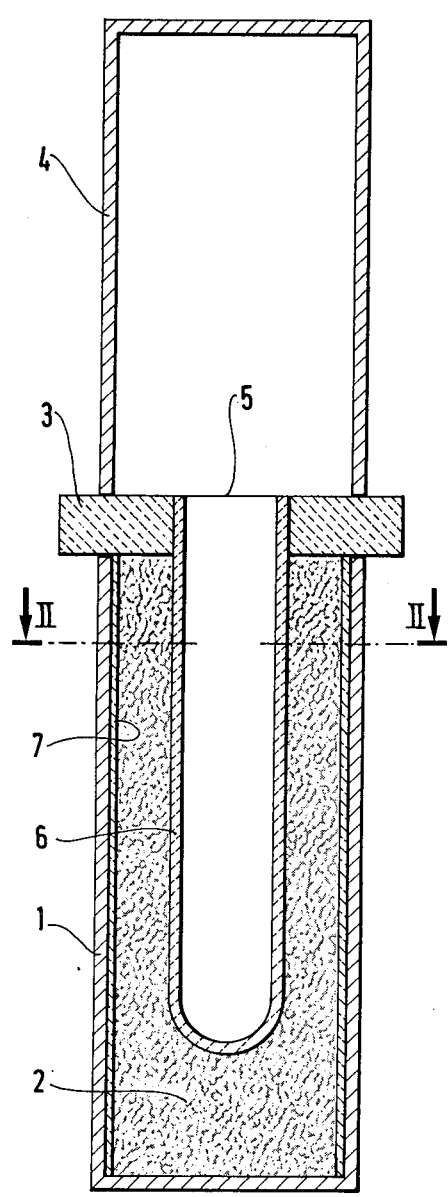
FIG. 1 is a cross-section in elevation of a sodium-sulphur cell in accordance with the invention.

The electric cell illustrated in FIG. 1 has a cylindrical positive compartment 1 with conductive outer walls which constitute the positive collector. The positive compartment is filled with felt or graphite fibres 2 impregnated with sulphur and polysulphides, the felt or graphite fibres performing the function of an electronic conductor. The upper part of the wall of the compartment 1 is fixed to the lower surface of a horizontal, circular, alpha alumina plate 3.

The lower part of a cylindrical negative tank or compartment 4 whose diameter is substantially equal to that of the positive compartment 1 and whose walls are also conductive, is fixed in the same way to the upper surface of the plate 3.

The tank contains a supply of negative active material made of liquid sodium.

The centre of the plate 3 has a cylindrical bore 5 with a vertical axis. The open upper end of an electrolyte tube 6 is inserted in the bore 5. The electrolyte tube is closed at its lower end. It is made of beta sodium alumina and contains the negative active material.

Figure 2:
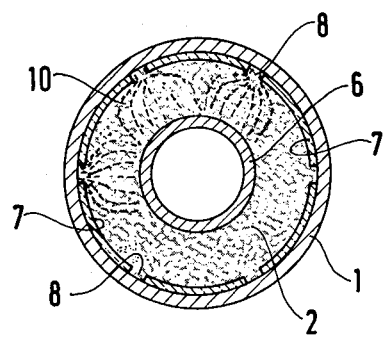
FIG. 2 is a cross-section along II—II in FIG. 1.

In accordance with the invention and with reference to FIGS. 1 and 2, the inner surfaces of at least the conductive side wall of the compartment 1 is partially covered with an electronically insulating layer 7, leaving some portions or holes or zones uncovered (see reference 8).

Such an insulating layer can be made of any material providing it is capable of withstanding attack by the sulphur and the polysulphides. By way of a non-limiting example, the layer may be made of a sulphide such as $Na_2S_2$, a ceramic substance such as alpha alumina, glass or a sulphuretted compound of aluminum or the like. Further, it may have some degree of porosity and although it must not be electronically conductive, in contrast, it may optionally be ionically conductive.

It will also be observed that the form and the disposition of the bare portions and of the insulated portions can be arranged at random or have some degree of symmetry.

By way of example, as illustrated in FIG. 2, the insulated portions 7 are in the form of longitudinal strips separated at regular intervals by non-insulated portions 8 which are also longitudinal.

Said non-insulated portions 8 could obviously be in the form of holes through the insulating layer 7 and of any shape.

Whatever solution is chosen, contact between the graphite fibres 2 and the wall of the compartment 1 is limited to the bare portions 8.

The operation of such an electric cell will now be described to show the advantages of the invention.

Figure 4:
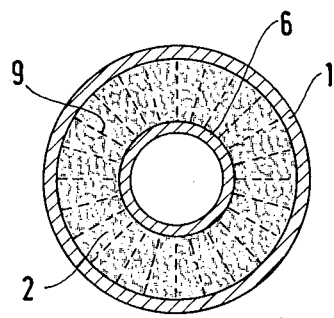
FIG. 4 shows schematically the disadvantages of the prior art and the advantages of the invention.

Firstly, with reference to FIG. 4, which shows very schematically the positive part of a conventional electric cell, dashed lines 9 show the lines of ionic current which prevail between the wall of the positive compartment 1 and the electrolyte tube 6. As illustrated, these lines of current are radial and during charging, the sulphur is deposited on the tube 6 as previously mentioned.

However, in contrast, on considering, now, FIG. 2 which illustrates an electric cell in accordance with the invention, it is seen that the lines of current are funneled 10 narrowing down from the electrolyte tube 6 to the bare portions 8.

Now, the Applicant has observed that the sulphur is deposited preferentially where the lines of ionic current are concentrated, i.e. precisely in the immediate vicinity of the bare portions 8 and not on the electrolyte tube. In this way, firstly, the electrons are transferred freely by the graphite fibres 2 and the bare portions 8 and secondly, the ionic transfers are not impeded at all by a layer of sulphur. This results in a electric cell being completely recharged.

Numerous variants which use the process which has just been described can obviously be envisaged.

Figure 3:
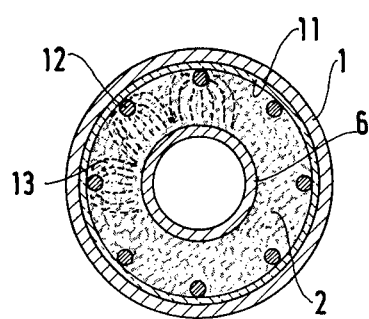
FIG. 3 shows a variant of an electric cell in accordance with the invention.

With reference to FIG. 3, the walls of the compartment 1 can be entirely coated with an insulating layer 11 and metal wires 12 connected or welded to the bottom of said compartment can be disposed on these walls.

The funnels 13 of the lines of current have a configuration analogous to that of the funnels in FIG. 2.

I claim:

1. A sodium-sulphur type electric cell which includes:
   a positive compartment which contains a positive active material which is liquid at operating temperature, and a positive current collector;
   a negative compartment which contains a negative active material which is liquid at operating temperature, and a negative current collector; and
   a solid electrolyte tube which separates the two compartments; wherein the positive current collector is at least partially coated with an electronically insulating layer, means which are suitable for concentrating the lines of ionic current which prevails between said electrolyte tube and said positive collector being provided in such a way that during the cell recharging process, the positive active material is preferentially deposited in the vicinity of said means.

2. An electric cell according to claim 1, wherein said means which are suitable for concentrating the lines of ionic current are constituted by holes in the insulating layer which covers the positive current collector.

3. An electric cell according to claim 1, wherein said means which are suitable for concentrating the lines of ionic current are constituted by electronic conductors which pass through the insulating layer.

4. An electric cell according to claim 1, wherein said positive compartment is contained in metal outer walls and surrounds said solid electrolyte tube which contains the negative active material and that the positive current collector is constituted by said metal walls.

5. An electric cell according to claim 1, wherein said electronically insulating layer is also ionically insulating.

6. An electric cell according to claim 1, wherein said electronically insulating layer is ionically conductive.

* * * * *